United States Patent
Dorenbosch et al.

(10) Patent No.: US 7,184,790 B2
(45) Date of Patent: Feb. 27, 2007

(54) METHOD AND APPARATUS FOR ESTABLISHING A TALK GROUP

(76) Inventors: Jheroen P. Dorenbosch, 594 CR 3585, Paradise, TX (US) 76073; Richard L. Bennett, 404 Timber Lake Dr., Southlake, TX (US) 76092

(*) Notice: Subject to any disclaimer, the term of this patent is extended or adjusted under 35 U.S.C. 154(b) by 429 days.

(21) Appl. No.: 10/114,131

(22) Filed: Apr. 2, 2002

(65) Prior Publication Data
US 2003/0186716 A1    Oct. 2, 2003

(51) Int. Cl.
H04B 7/00 (2006.01)
(52) U.S. Cl. ............. 455/519; 455/518; 455/520
(58) Field of Classification Search ........... 455/519, 455/518, 517, 435, 509, 458, 416, 456, 466, 455/520, 415, 428, 553.1
See application file for complete search history.

(56) References Cited

U.S. PATENT DOCUMENTS

| | | | | |
|---|---|---|---|---|
| 5,040,238 A * | 8/1991 | Comroe et al. | ........... | 455/520 |
| 5,513,381 A * | 4/1996 | Sasuta | ........... | 455/509 |
| 5,758,291 A * | 5/1998 | Grube et al. | ........... | 455/518 |
| 6,144,673 A | 11/2000 | Korus | | |
| 6,192,234 B1 * | 2/2001 | Chavez, Jr. | ........... | 455/414.1 |
| 6,253,091 B1 | 6/2001 | Naddell et al. | | |
| 6,275,500 B1 * | 8/2001 | Callaway et al. | ........... | 370/449 |
| 6,292,671 B1 * | 9/2001 | Mansour | ........... | 455/518 |
| 6,308,079 B1 | 10/2001 | Pan et al. | | |
| 6,385,461 B1 * | 5/2002 | Raith | ........... | 455/518 |
| 6,522,886 B1 * | 2/2003 | Youngs et al. | ........... | 455/450 |
| 6,542,750 B2 * | 4/2003 | Hendrey et al. | ........... | 455/456.1 |
| 6,600,928 B1 * | 7/2003 | Ahya et al. | ........... | 455/518 |
| 6,640,096 B1 * | 10/2003 | Alho et al. | ........... | 455/406 |
| 2001/0027111 A1 | 10/2001 | Motegi et al. | | |
| 2002/0009990 A1 | 1/2002 | Kleier et al. | | |
| 2002/0019829 A1 | 2/2002 | Shapiro | | |
| 2002/0022453 A1 | 2/2002 | Balog et al. | | |
| 2002/0037735 A1 * | 3/2002 | Maggenti et al. | ........... | 455/517 |
| 2002/0037736 A1 * | 3/2002 | Kawaguchi et al. | ........ | 455/518 |
| 2002/0086676 A1 * | 7/2002 | Hendrey et al. | ........... | 455/445 |
| 2002/0107008 A1 * | 8/2002 | Hendrey et al. | ........... | 455/416 |
| 2003/0048764 A1 * | 3/2003 | Diep et al. | ........... | 370/335 |
| 2003/0083086 A1 * | 5/2003 | Toyryla et al. | ........... | 455/518 |
| 2003/0153343 A1 * | 8/2003 | Crockett et al. | ........... | 455/519 |

FOREIGN PATENT DOCUMENTS

| | | |
|---|---|---|
| EP | 0 680 174 A2 | 4/1995 |
| WO | WO 99/17566 A2 | 4/1999 |
| WO | WO 01/24551 A1 | 4/2001 |

* cited by examiner

*Primary Examiner*—Matthew D. Anderson
*Assistant Examiner*—Tan Trinh
(74) *Attorney, Agent, or Firm*—Kenneth Haas; Kevin D. Wills

(57) ABSTRACT

When any remote unit (113–118) desires to create a talk group, it transmits an inbound message to a group call database (112). The inbound message includes the identity of the requesting communication device, and the participants of the talk group. Upon receiving the request, group the call database (112) provides an outbound message to all members of the newly created talk group giving them a chance to opt out of inclusion into the new talk group. The database (112) then creates a database entry with the new talk group and those remote units that positively responded to the outbound message.

1 Claim, 3 Drawing Sheets

METHOD AND APPARATUS FOR ESTABLISHING A TALK GROUP

FIELD OF THE INVENTION

The present invention relates generally to establishing a talk group, and in particular, to a method and apparatus for establishing a talk group within a communication system.

BACKGROUND OF THE INVENTION

Unlike standard interconnect services provided by today's cellular systems, a dispatch group call service enables a user to communicate with a group of people simultaneously and instantaneously, usually by depressing a push-to-talk (PTT) button. Using a cellular communication system's standard interconnect services would not allow such a call to occur instantaneously since either a telephone number would need to be dialed for a three-way call or arrangements would need to be made to setup a conference call.

Likewise, the dispatch service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch call service.

A problem exists with dispatch calls in that a user is limited to establishing dispatch calls only with members of pre-established groups. As such, a subscriber unit (i.e., a communication device) cannot dynamically establish a group communication. Therefore, a need exists for a method and apparatus for dynamically establishing a talk group within a communication system.

DETAILED DESCRIPTION OF THE DRAWINGS

Figure 1:
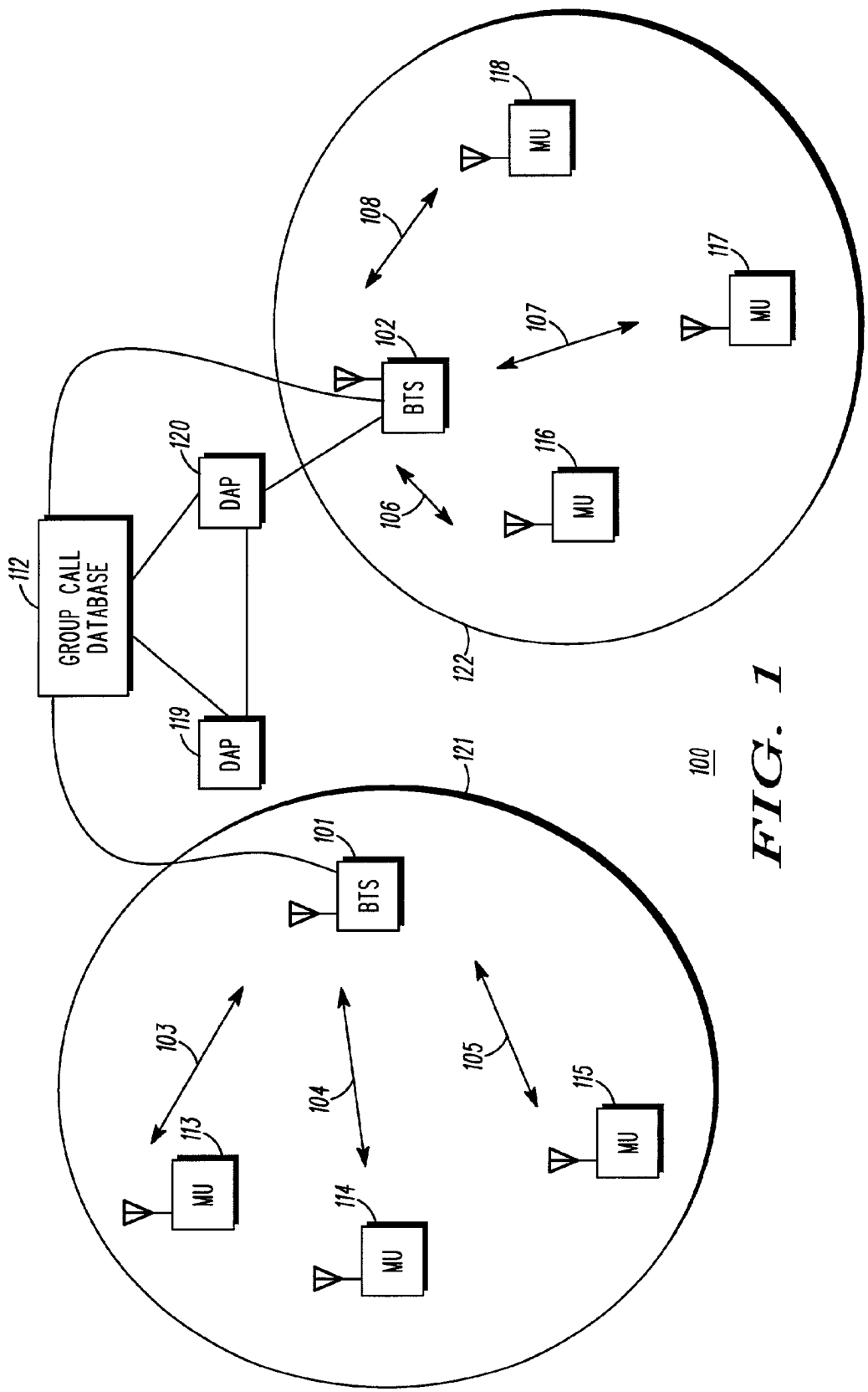
FIG. 1 is a block diagram of a communication system in accordance with the preferred embodiment of the present invention.

To address the above-mentioned need, a method and apparatus for establishing a talk group is provided herein. When a remote unit desires to create a talk group, the remote unit obtains the participants of the talk group by identifying all remote unit's in proximity to the remote unit. The remote unit then transmits an inbound message to a group call database. The inbound message includes the identity of the requesting communication device, and the participants of the talk group. Upon receiving the request, the call database provides an outbound message to all members of the newly created talk group giving them a chance to opt out of inclusion into the new talk group. The database then creates a database entry with the new talk group and those remote units that positively responded to the outbound message.

The above procedure allows for the dynamic creation of talk groups within a dispatch communication system. Because of this, the inefficiencies of prior-art talk group establishment are greatly reduced.

The present invention encompasses a method for establishing a talk group within a communication system. The method comprises the steps of determining a plurality of remote units in proximity to a first remote unit, providing a list of the plurality of remote units to infrastructure equipment, and establishing a talk group based on the list.

The present invention additionally encompasses a method for establishing a talk group. The method comprises the steps of receiving an over-the-air message, wherein the over-the-air message comprises an identity of a requesting communication device, and proposed participants to a talk group. Next, an outbound message is transmitted to at least one proposed participant, wherein the outbound message allows the participant to opt out of inclusion into the talk group. An inbound message is then received in response to the outbound message and a talk group is created based on the inbound message.

The present invention additionally encompasses a method comprising the steps of receiving, by a first remote unit, a request to provide identity information to a second remote unit, and providing identity information to the second remote unit, wherein the step of providing identity information to the second remote unit causes the first remote unit to be included in a talk group with the second remote unit.

The present invention additionally encompasses a remote unit. The remote unit comprises a short-range communication unit outputting those remote units in proximity to the remote unit, a talk group database storing those remote units in proximity to the remote unit, and a transceiver providing a list of those remote units in proximity to the remote unit to infrastructure equipment, causing the infrastructure equipment to establish a talk group based on the list.

As described above, the present invention can be used for the establishment of a talk group. The invention allows for both the creation of a new group that contains a first remote unit and of remote units in proximity of that unit, and for the extension of a preexisting talk group by the addition of remote units in proximity to the first remote unit.

Turning now to the drawings, wherein like numerals designate like components, FIG. 1 is a block diagram of communication system 100 in accordance with the preferred embodiment of the present invention. In the preferred embodiment of the present invention, communication system 100 utilizes the Motorola Inc. iDEN system protocol, but in alternate embodiments communication system 100 may utilize other analog or digital cellular communication system protocols capable of supporting group call operation. Such protocols include, but are not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes group call database 112 coupled to Radio Access Networks (RANs) 121–122. Each RAN 121–122 comprises a plurality of remote, or mobile units (MUs) 113–118, at least one Base Transceiver Station (BTS) 101–102, and at least one Dispatch Application Processor (DAP) 119–120. Although not shown, RANs 121–122 additionally include well known network elements such as Mobile Switching Centers (MSCs), Centralized Base Station Controllers (CBSCs) in a circuit switch network, or such as Multiple Control Units (MCUs) in a CDMA system, and Radio Network Controllers (RNCs), Gatekeepers (GKs) and GateWays (GWs) in a packet switch network. It is contemplated that network elements within communication system 100 are configured in well known manners with processors, memories, instruction sets, and the like, which function in any suitable manner to perform the function set forth herein.

As shown, base stations 101–102 are capable of communicating with remote units 113–118 via over-the-air channels 103–108, respectively. Each over-the-air channel 103–108 preferably comprises a unique frequency/timeslot (or code in a CDMA system), however, in alternate embodiments (e.g., multicast scenarios) channels 103–108 may be shared among remote units 113–118. In the preferred embodiment of the present invention base stations 101–102 are capable of providing dispatch services to remote units 113–118. Additionally, each remote unit is capable of dynamically establishing talk groups. Particularly, each remote unit includes memory (not shown) that stores talk groups. The memory may be any means for storing digital information such as, but not limited to random access memory, non-volatile RAM, read only memory, etc. The talk group participants stored within the memory may be preloaded into the communication devices, or may be dynamically created on a real-time basis.

The user of remote unit 114 may desire to create a talk group including remote unit 114 and one or more of the nearby remote units 113 and 115. Alternatively the user may desire to add one or more of the nearby remote units 113 and 115 to an existing talk group. The remote unit 114 transmits an inbound message to group call database 112. The inbound message is preferably transmitted via an over-the-air channel to a particular base station, and includes the identity of the requesting communication device, and the identity of at least one participant to be added to the talk group (i.e., units 113 and 115) and the identity of the talk group. Upon receiving the request, the base station forwards it to group call database 112. Group call database 112 locates all remote units that are added to the proposed talk group by accessing a home location register (not shown) or another well-know technique such as by accessing a SIP registrar (SIP is described in the Internet Engineering Task Force (IETF) draft-ietf-sip-rfc2543bis-09). Preferably, group call database 112 then provides an outbound message to all nearby units of the talk group (via their respective base station/channel) giving them a chance to opt out of inclusion into the new talk group via a response message. All base stations provide the remote units' responses back to data base 112. Database 112 then updates the database entry with the talk group and those remote units that positively responded to the outbound message.

Figure 2:
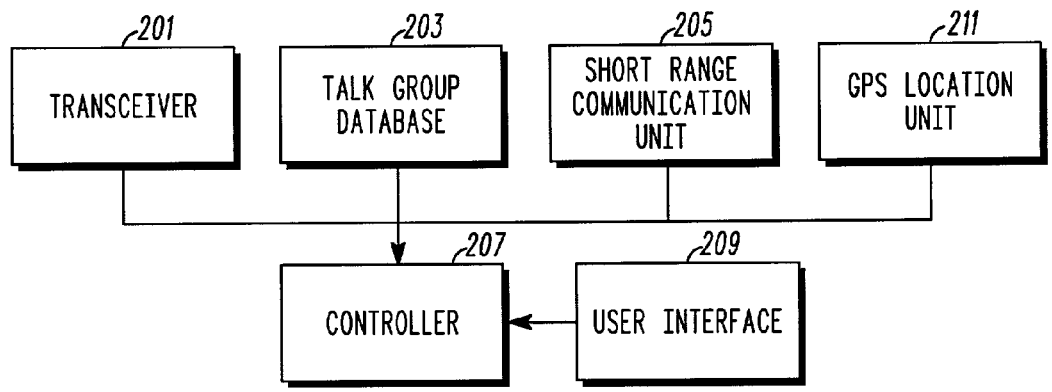
FIG. 2 is a block diagram of a remote unit in accordance with the preferred embodiment of the present invention.

FIG. 2 is a block diagram of a remote unit in accordance with the preferred embodiment of the present invention. As shown the remote unit comprises transceiver 201, talk group database 203, short range communicator 205, controller 207, and user interface 209. Optionally the remote unit may contain a geographic position determination unit 211, such as a GPS. Controller 207 may be a microprocessor, micro controller, digital signal processor, central processing unit, and/or any other device that manipulates digital information based on programming instructions. Talk group database 203 may be read-only memory, random-access memory, disk memory, CD ROM memory, and/or any other means for storing digital information. Short range communication unit 205 is preferably a BLUETOOTH® transmitter, however, in alternate embodiments, short range communication 205 may utilize other communication protocols such as, but not limited to the IEEE 802.11 standard for wireless LAN applications, or the Shared Wireless Access Protocol (SWAP). A valuable alternative for short range communication unit 205 would use an infra-red link.

During talk group creation, a user of remote device 114 will select an option to create a talk group via the remote unit's user interface 209. This will instruct controller 207 to access short range communication unit 205. The BLUETOOTH specification defines a universal radio interface in the 2.45 GHz frequency band that enables remote units 113–118 to communicate wirelessly via a short-range, ad hoc network. Specifically, by implementing BLUETOOTH connectivity between remote units 113–118, an ad hoc wireless network can be created such that each device can share identification information with other users on the network. In particular, the BLUETOOTH protocol stack includes radio, baseband, and software layers and provides for interoperability between devices from different manufacturers for specific services such as data exchange. The general usage models are defined by the BLUETOOTH Profiles Specification and these include generic, telephony, networking, serial, and object exchange. The profile defines a selection of messages and procedures, or capabilities, from the BLUETOOTH specifications and gives an unambiguous description of the interface for specified services and use cases.

The remote unit 114 establishes communication using the short range communication unit 205. Given the short range nature of the link, only nearby remote units such as units 113 and 115 can be accessed. The remote unit 114 then uses the short range link to obtain the identities of all local remote unit's identities connected via the short range communication unit 205, and stores the identities in database 203. (The use of an infra-red link also has the useful properties that its range is well limited and that it is directional).

Thus, in accordance with the preferred embodiment of the present invention, the user of remote unit 114 can point remote unit 114 at specific nearby remote units to include them in the group. For example, the user can point the infra-red or BLUETOOTH link of unit 114 at the infra-red port of unit 113 and can thus add unit 113 to a group, while avoiding the addition of unit 115. In an alternate embodiment of the present invention, the remote unit 114, instead of obtaining the identity of a nearby remote unit, may simply "grab" the membership definition of another user's talk group, and append all members of the other user's group to its own group. Regardless of how the remote unit obtains the call participants, controller 207 ends up with a list of remote units that it desires to place in a talk group. It should be noted that because BLUETOOTH is utilized for short-range communication, only those remote units within a certain distance (typically 20 meters) are included in the newly-created talk group.

In a variation on the preferred embodiment of the present invention, the user of remote unit 114 may now be given the opportunity to exclude undesired nearby units from inclusion in the group. For example, the user's intent may be to add unit 113 to a group, but the user's unit 114 may establish short range communication with both nearby units 113 and 115. In a preferred embodiment of this variation, the user's unit would present a list of identities of nearby units it has obtained via the user interface 209. The same user interface then lets the user remove those identities from the list that it does not want included in the group. The display of the list also gives positive feedback to the user that the creation or modification of the group is proceeding properly.

Controller 207 of unit 114 then accesses transceiver 201 and transmits an inbound message to its base station, eventually to group call database 112. The inbound message includes the identity of the requesting communication device, and the requested participants of the talk group. As discussed above, each remote unit identified in the talk group will be allowed to opt out of the talk group. Particularly, all requested participants will receive an over-the-air message from their respective base stations allowing them to opt out of the talk group. Responding to the over-the-air message causes the respective base station to forward opt-in or opt-out information to group call database 112. The exchange of messages between base station and the units of the participants that opt in can also be used to forward information in those units that identifies the new or modified group. The information may consist of a group identifier or of an enumerated list of participants.

Once database 112 has been populated with the newly-created talk group, group calling takes place as known in the art. For example, a remote unit, such as remote unit 114, may intiate a group call by sending an over-the-air group call request message to base station 101, usually by pressing a PTT button. The group call request message contains the identifier of the desired target group. The network entities DAP 119, 120 and the Group Call Database 112 collaborate to locate (page) the target remote units that are members of the target group and to assign the appropriate resources to the call, such as control and traffic radio channels. In a dispatch communication system 100, these network entities will further control which of the member remote units (113, 114) will have the right to be the talker. In other communication systems, a conference coordination unit (not shown) may replicate and mix the voices of one or more talker units. Alternatively, a unit, such as remote unit 114 may also initiate a group call by sending a call request that contains an enumerated list of target member remote units. It will be understood that any remote unit that opted into a group and that has received a group identifier or an enumerated list of participants can initiate a call to that group using prior art methods.

The above procedure allows for the dynamic creation and modification of talk groups within a dispatch communication system. Because of this, the inefficiencies of prior-art talk group establishment are greatly reduced.

It will be understood by those skilled in the art that well-known methods can be used by the remote units 113–118 for authentication and authorization when using the short range communication unit 205 to guarantee security and to protect the security of the user. For example, the remote unit 113 of an employee of a high company firm can be programmed not to provide its identity to remote units of competing companies.

Figure 3:
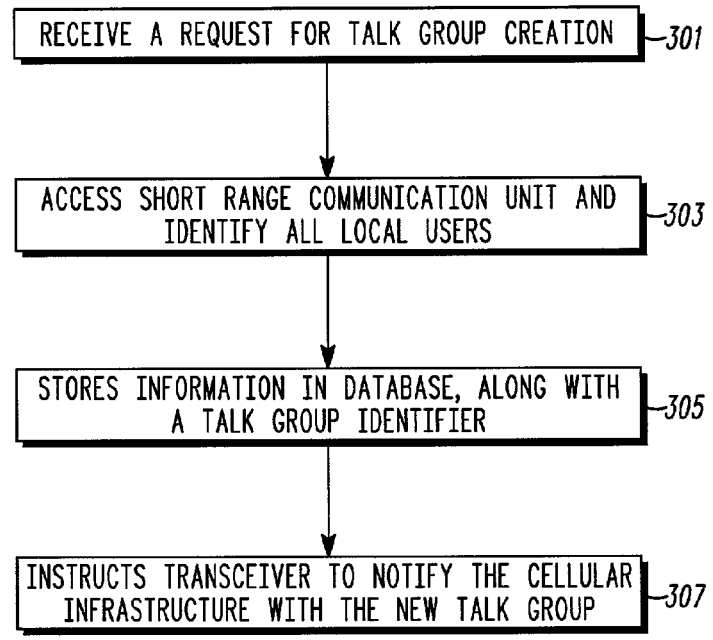
FIG. 3 is a flow chart showing operation of the remote unit of FIG. 2 in accordance with the preferred embodiment of the present invention.

FIG. 3 is a flow chart showing operation of the remote unit 114 of FIG. 2 in accordance with the preferred embodiment of the present invention. The logic flow begins at step 301 where controller 207 receives a request for talk group creation or extension. In response, controller 207 accesses short range communication unit 205 and identifies those remote units that are in proximity to the remote unit (step 303). Once all local remote units are identified, controller 207 creates a talk group and stores this information in database 203, along with a talk group identifier (step 305). For example, an individual user may be at a business meeting having a small amount of information (e.g., the next meeting date) to provide to the participants after the meeting is over. In order to do this, the user may create a talk group with the participants at the meeting. Therefore, the user's remote unit will locate all local remote units, and create a talk group. The user will be prompted for a talk group name, and the participants stored in database 203 under that name.

In an optional step (not shown), the controller 207 may use the user interface 209 to give the individual user an opportunity to review a list of identified local remote units in order to remove unwanted participants.

Continuing, once database 203 has been populated with the newly-created talk group, controller 207 instructs transceiver 201 to notify the cellular infrastructure with the new talk group (step 307). In particular, transceiver 201 transmits an inbound message to group call database 112 via over-the-air communication with its serving base station 101. The inbound message includes the identity of the requesting communication device, and the participants of the talk group. As discussed above, this causes the infrastructure equipment to "invite" the identified remote units to become part of the group. The infrastructure equipment (database 112) then creates a database entry with the new talk group and those remote units that positively responded to the invitation.

Figure 4:
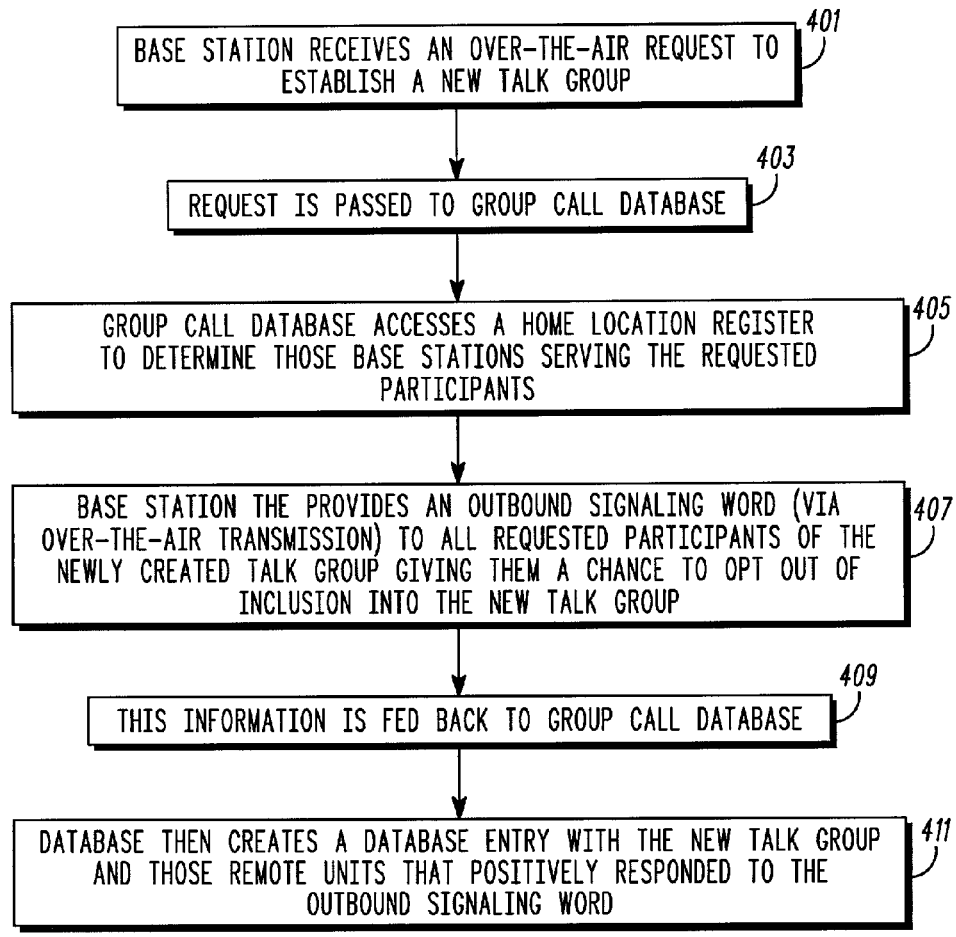
FIG. 4 is a flow chart showing operation of a base station of FIG. 1 in accordance with the preferred embodiment of the present invention.

FIG. 4 is a flow chart showing operation the infrastructure equipment of FIG. 1 in accordance with the preferred embodiment of the present invention. The logic flow begins at step 401 where a base station receives an over-the-air request to establish a new talk group or add one or more new remote units to an existing talk group. At step 403 this request is passed to group call database 112. As discussed above, this request comprises an inbound message that includes the identity of the requesting communication device, and the requested participants of the talk group. Upon receiving the request, group call database 112 accesses a home location register to determine those base stations serving the requested participants (step 405). Base stations 101–102 then provide an outbound message (via over-the-air transmission) to all requested participants of the newly created talk group giving them a chance to opt out of inclusion into the new talk group (step 407). An inbound message is received from the remote units and this information is fed back to database 112 (step 409). Database 112 then creates a database entry with the new talk group and those remote units that positively responded to the outbound message (step 411). Once database 112 has been populated with the newly-created talk group, group calling takes place as known in the art, and will allow members of the newly-created talk group to communicate simultaneously and instantaneously, typically by depressing a push-to-talk (PTT) button.

Figure 5:
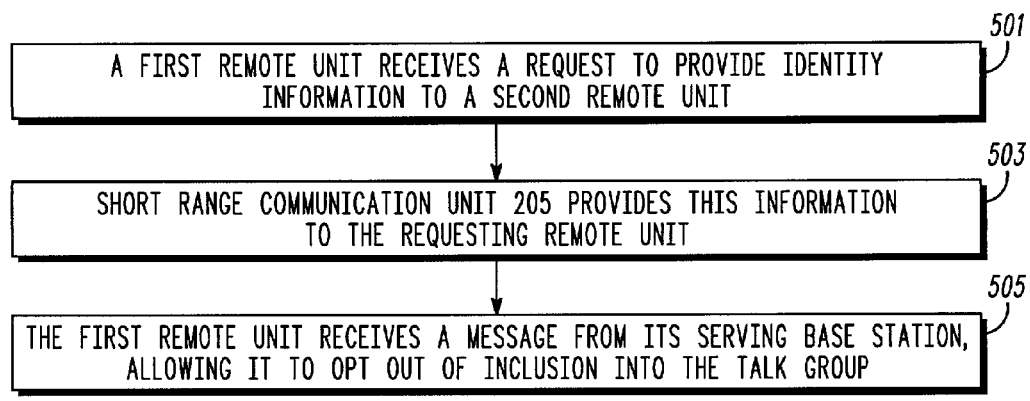
FIG. 5 is a flow chart showing operation of the remote unit of FIG. 2 in accordance with the preferred embodiment of the present invention.

FIG. 5 is a flow chart showing operation of a remote unit of FIG. 1 in accordance with the preferred embodiment of the present invention. In particular, the following description shows those steps necessary for a remote unit to become a member of a talk group when requested. The logic flow begins at step 501 where a first remote unit receives a request to provide identity information to a second remote unit. At step 503, short range communication unit 205 provides this information to the requesting remote unit. Next, at step 505, the first remote unit receives a message from its serving base station, allowing it to opt out of inclusion into the talk group.

While the invention has been particularly shown and described with reference to a particular embodiment, it will be understood by those skilled in the art that various changes in form and details may be made therein without departing from the spirit and scope of the invention. For example, although BLUETOOTH was utilized to detect remote units in proximity to the remote unit creating the talk group, any method may be utilized to detect these remote units. Such methods include wireless location techniques such as trilateration, Angle of Arrival (AOA), Time-Difference AOA, etc. It is intended that such changes come within the scope of the following claims.

Using such alternative methods a variation of this invention can be implemented without the use of a short range communication unit. In this embodiment, the geographical position of remote units is known to the communication system 100. This can be the result of wireless location techniques such as trilateration, Angle of Arrival (AOA), Time-Difference AOA, or by letting the system 100 access the measurements of a geographic position determination unit 211, built in the remote units, as shown in FIG. 2.

When the user of remote unit 114 desires to create or modify a talk group including remote unit 114 and one or more of the nearby remote units (like units 113 and 115), the remote unit 114 transmits an inbound message to group call database 112. The inbound message includes the identity of the requesting communication device, and the identity of the talk group. Upon receiving the request, the base station forwards it to group call database 112. Group call database 112, in collaboration with other communication system entities like DAPs 119, 120 and BTSs 101, 102 determines the position of the requesting unit 114 and determines all other requesting units within a predetermined distance from the requesting unit 114. The group call database 112 then sends a message to requesting unit 114 that contains the list of determined nearby units. As described above, the user has the possibility to review the list of nearby units and to communicate the reviewed list to the group call data base for the creation or modification of the group. Again as described above, the group call database 112 then provides an outbound message to all reviewed nearby units, giving them a chance to opt out of inclusion into the new talk group via a response message. the remote units' responses back to data base 112. Database 112 then uses the remote units' responses to update the database entry for the talk group with those remote units that positively responded to the outbound message.

Using alternative methods, another variation of the invention can be implemented where the group call database 112 is not directly involved in some or all of the steps of the establishment of a talk group. This variation can be used in communication systems where a remote unit 114 can initiate a group call by sending a call request that contains a list of target member remote units that are to be included into the group call. In this variation the remote unit again uses the short range over-the-air communication to obtain the identity of at least one nearby remote unit. Again, in an optional step, controller 207 may use the user interface 209 to give the individual user an opportunity to review a list of identified local remote units in order to remove unwanted participants. In this embodiment, optionally, the controller 207 can use the short range communication unit 205 to send an over-the-air outbound message to the local remote units in the (reviewed) list to allow them to opt out of the talk group. The local remote units, in response to the outbound message, can send a response inbound message to the initiating remote unit 114 via the short range communication unit 205. The controller 207 of remote unit 114 can then use the short range communication unit 205 to send another over-the-air message to the local remote units that opted in, the message containing a list of member remote units that are to be included into the group. Remote unit 114 and the local remote units that opted in will store the list of member remote units in its talk group database 203. If one of the units later wants to make a call to the group, it sends a call request that contains the stored enumerated list of target member remote units of the group. The group call may proceed using the over-the-air channels 103–108, the base stations 101, 102 and other infrastructure resources 112, 119, 120 of the communication system 100. Alternatively, all or part of the member remote units may use the short range communication unit 205 to establish short-range over-the-air channels needed to carry the group call.

The invention claimed is:

1. A method for establishing a previously undefined talk group within a communication system, the method comprising the steps of:

a first remote unit determining, via over-the-air communication with one or more second remote units, at least one of the one or more second remote units in proximity to the first remote unit;

the first remote unit providing a list of the at least one of the one or more second remote units to infrastructure equipment to establish the previously undefined talk group, wherein providing the list comprises the steps of:

retrieving a previously existing list of ones of the one or more second remote units comprising an existing talk group;

appending the at least one of the one or more second remote units to the previously existing list to create the list;

providing the list to the infrastructure equipment; and establishing the previously undefined talk group based on the list.

* * * * *